United States Patent
Lu et al.

(10) Patent No.: US 12,080,581 B2
(45) Date of Patent: *Sep. 3, 2024

(54) METHOD FOR PUF GENERATION USING VARIATIONS IN TRANSISTOR THRESHOLD VOLTAGE AND SUBTHRESHOLD LEAKAGE CURRENT

(71) Applicant: Taiwan Semiconductor Manufacturing Co., Ltd., Hsinchu (TW)

(72) Inventors: Shih-Lien Linus Lu, Hsinchu (TW); Cormac Michael O'Connell, Kanata (CA)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,875

(22) Filed: Apr. 26, 2023

(65) Prior Publication Data

US 2024/0079257 A1   Mar. 7, 2024

Related U.S. Application Data

(60) Continuation of application No. 17/339,812, filed on Jun. 4, 2021, now Pat. No. 11,664,258, which is a
(Continued)

(51) Int. Cl.
*G06F 21/00*   (2013.01)
*B25J 9/16*    (2006.01)
(Continued)

(52) U.S. Cl.
CPC ............ *H01L 21/68* (2013.01); *B25J 9/1664* (2013.01); *B25J 9/1692* (2013.01);
(Continued)

(58) Field of Classification Search
CPC ............... H01L 21/68; H01L 21/67265; H01L 21/67386; H01L 21/681; B25J 9/1664;
(Continued)

(56) References Cited

U.S. PATENT DOCUMENTS 9,966,954 B1 *  5/2018  Yang ..................... H03K 3/84
10,090,025 B2 * 10/2018  Elbaum .................. G06F 21/71
(Continued)

*Primary Examiner* — Yogesh Paliwal
(74) *Attorney, Agent, or Firm* — Duane Morris LLP

(57) ABSTRACT

Disclosed is a physical unclonable function generator circuit and method. In one embodiment, a physical unclonable function (PUF) generator comprising: a plurality of PUF cells, wherein each of the plurality of PUF cells comprises a first MOS transistor and a second MOS transistor, wherein terminal S of the first MOS transistor is connected to terminal D of the second MOS transistor at a dynamic node, terminal D of the first MOS transistor is coupled to a first bus and terminal G of the first NMOS transistor is coupled to a second bus, and terminals S and G of the second NMOS transistor are coupled to ground; a plurality of dynamic flip-flop (DFF) circuits wherein each of the plurality of DFF circuits is coupled to each of the plurality of PUF cells respectively; a population count circuit coupled to the plurality of DFF circuits; and an evaluation logic circuit having an input coupled to the population count circuit and an output coupled to the plurality of DFF circuits.

20 Claims, 11 Drawing Sheets

Related U.S. Application Data division of application No. 15/965,429, filed on Apr. 27, 2018, now Pat. No. 11,043,404.

(60) Provisional application No. 62/585,731, filed on Nov. 14, 2017.

(51) Int. Cl.
*H01L 21/67* (2006.01)
*H01L 21/673* (2006.01)
*H01L 21/68* (2006.01)
*B25J 11/00* (2006.01)

(52) U.S. Cl.
CPC .. *H01L 21/67265* (2013.01); *H01L 21/67386* (2013.01); *H01L 21/681* (2013.01); *B25J 11/0095* (2013.01)

(58) Field of Classification Search
CPC ... B25J 9/1692; B25J 11/0095; H04L 9/3278; H04L 9/3247
See application file for complete search history.

(56) References Cited

U.S. PATENT DOCUMENTS

| | | | |
|---|---|---|---|
| 2012/0106235 A1 | 5/2012 | Christensen et al. | |
| 2014/0218067 A1* | 8/2014 | Li | H04L 9/3278 326/8 |
| 2015/0098268 A1* | 4/2015 | Yabuuchi | G11C 11/418 365/154 |
| 2016/0285639 A1* | 9/2016 | Mathew | G06Q 10/08 |
| 2017/0180140 A1* | 6/2017 | Mai | H04L 9/3278 |

* cited by examiner

METHOD FOR PUF GENERATION USING VARIATIONS IN TRANSISTOR THRESHOLD VOLTAGE AND SUBTHRESHOLD LEAKAGE CURRENT

CROSS-REFERENCE TO RELATED APPLICATION

This application is a continuation of U.S. Pat. No. 17,339, 812, filed Jun. 4, 2021, which is a divisional of U.S. patent application Ser. No. 15/965,429, filed Apr. 27, 2018, now U.S. Pat. No. 11,043,404, which claims priority to U.S. Provisional Patent Application No. 62/585,731 filed on Nov. 14, 2017, each of which are incorporated by reference herein in their entireties.

BACKGROUND

With the increasing use of integrated circuits in electronic devices that provide different types of information for a variety of different applications, there has been an increasing need to adequately protect sensitive and/or critical information that may be stored within an electronic device to limit access to such information to only other devices that have permission to access.

Some examples of such applications include the authentication of devices, protection of confidential information within a device, and securing a communication between two or more devices. It has become widely recognized that random number generators are fundamentally important in the computer age. A high quality random number generator to generate true random numbers is desirable for cryptographic applications. For example, true random numbers are used as an encryption key for encrypting information and messages.

A physically unclonable function (PUF) generator is a physical structure generally within an integrated circuit that provides a number of corresponding outputs (e.g., responses) in response to inputs (e.g., challenges/requests) to the PUF generator. There are many different implementation approaches including delay-chain-based PUF generators and memory-based PUF generators. A memory-based PUF generator translates the variations in an array of memory devices, typically either SRAM (static random-access memory) or DRAM (dynamic random-access memory) devices, into a binary sequence. Both methods are based on randomness in physical properties among devices caused by inherent variations in a semiconductor manufacturing process, e.g., geometric dimension and doping concentration. A PUF generator candidate should be unique, unclonable and reliable. Furthermore, it should also have small area, high throughput rate, low latency and low power consumption. Currently, both SRAM and DRAM based PUF generators suffer various limitations. For example, a SRAM-based PUF generator can be only accessed during boot time, and do not provide strong PUF configuration. There exists a need to develop a PUF generator that can be queried during run-time, while providing a strong PUF configuration.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physically unclonable function (PUF) generator is generally used for authentication and secret key storage without requiring secure electrically erasable programmable read-only memory (EEPROMs) and/or other expensive hardware (e.g., battery-backed static random-access memory). Instead of storing a key in a digital memory, a PUF generator derives a key based its unique physical characteristics caused by inherent process variations to differentiate itself from others that are produced even from a same fabrication process. Generally, such key is referred to as a "PUF signature". Variations in a number of parameters can be used to define such a signature such as, for example, gate delay, threshold voltage, power-on state of a SRAM-based device, and/or any of a variety of physical characteristics of an IC. Furthermore, a charge decay (e.g., discharge process) can be also used as a PUF signature, which is typically used in DRAM-based PUF generators. In the present disclosure, a circuit and method using a decay-based CMOS pseudo-DRAM PUF generator comprising a plurality of PUF cells, wherein each of the plurality of PUF cells comprises at least two CMOS transistors, to generate a PUF signature are presented. Inherent process variations lead to different current leakage pathways in each of the plurality of PUF cells and thus a unique combination of different transient discharge behaviors at pre-charged dynamic nodes. Such current leakage pathways comprise sub-threshold current, gate leakage current, gate induced drain leakage current, reverse bias current, etc. By continuously monitoring the discharge behavior and comparing a voltage value on the dynamic node at a particular sampling time to a trigger point, an output logic "0" or "1" can be determined for a corresponding PUF cell. In one embodiment, when half of the total number (e.g., N) of dynamic nodes of corresponding PUF cells in a PUF generator are flipped (i.e., switched from 1 to 0), a PUF signature, an N-bit binary sequence of logic states of all PUF cells at the sampling time, can be obtained. Yet, in another embodiment, discharge of a first dynamic node in a PUF cell is used to charge a pre-discharged second dynamic node in the same PUF cell. When half of the total number (e.g., N) of second dynamic nodes of corresponding PUF cells in a PUF generator are flipped (i.e., switched from 0 to 1), a PUF signature can be obtained.

Figure 1A:
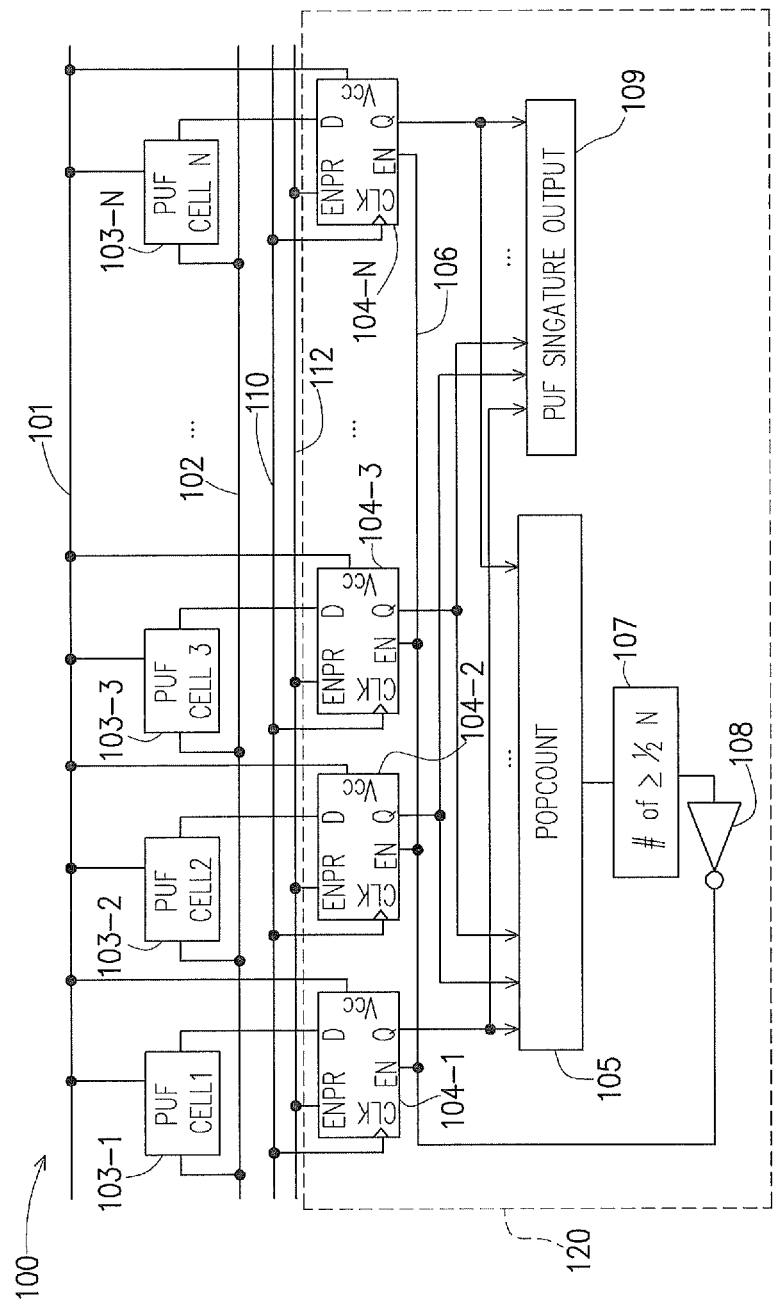
FIG. 1A illustrates an exemplary block diagram of a PUF generator, in accordance with various embodiments of the present disclosure.

FIG. 1A illustrates an exemplary block diagram of a PUF generator 100, in accordance with various embodiments of the present disclosure. It is noted that the system 100 is merely an example, and is not intended to limit the present disclosure. Accordingly, it is understood that additional operations may be provided before, during, and after the system 100 of FIG. 1, and that some other operations may only be briefly described herein.

In some embodiments, the PUF generator 100 comprises a plurality of PUF cells 103 (e.g., 103-1, 103-2, . . . and 103-N) and a finite state machine (FSM) 120, wherein the FSM 120 comprises a plurality of dynamic flip-flop circuits (DFF) 104, a population counter (Popcount), and an evaluation logic circuit. The plurality of PUF cells 103 are respectively coupled between a first bus 101 and a second bus 102, wherein the first bus 101 has a voltage level of Vcc and the second bus 102 is to charge so as to write "1" to the plurality of PUF cells 103. Each of the plurality of PUF cells 103 comprises 2 NMOS transistors, in some embodiments, which will be further discussed in detail in FIG. 1B. The plurality of DFF 104 are respectively coupled to a third bus 110 at terminals CLK, a fourth bus 112 at terminals ENPR, and a fifth bus 106 at terminals EN. Output terminals of the plurality of PUF cells 103 are then coupled to terminals D of the corresponding DFF 104. Output terminals of the plurality of DFF 104 are then coupled to a Popcount 105. An output terminal of the Popcount 105 to determine a number of "0"s in an N-bit input is then connected to the evaluation logic circuit 107. An output terminal of the evaluation logic circuit 107 is electrically coupled to an inverter which is then connected to the fifth bus 106.

A Popcount 105 can be a well-known computer operation using genetic algorithms, in certain embodiments, which can be generally realized using software based techniques that span a wide range of algorithms. These algorithms comprise serial shifting, table lookup, arithmetic logic counting, emulated popcount, hamming distance bit vertical counter, frequency division, etc. Alternatively, according to other embodiments, the Popcount 105 can be configured using a hardware circuitry. A hardware circuitry for the Popcount 105 can comprise half adders, full adders, Carry Save adders, and etc., with at least one logic gates (XOR, AND, etc.). The number of logic gates and thus the complexity of the Popcount 105 is defined by the number of inputs and thus the number of PUF cells 104. In some embodiments, the number of logic gates is minimized to minimize delay and minimize number of charges can be implemented to maximize the speed as well as other performance, including cost and number of interconnects. In certain embodiments, the Popcount 105 is a combination of a software and a hardware technique to achieve improved performance.

If a number of inputs of the Popcount 105 with flipped logical states (e.g., switched from low to high, or high to low) at a sampling time is equal to or greater than N/2, the evaluation logic circuit 107 outputs a high level (e.g., logic "1") in accordance with various embodiments. The high level is applied to the fifth bus 106 and is further applied to terminals EN of the plurality of DFFs 104 through an inverter 108. A low level on terminals EN of the plurality of DFFs 104 terminates the sampling process and output a PUF signature comprising a binary sequence of N-bit logic states of PUF cells 104 at the sampling time as a PUF signature 109. Otherwise, the plurality of DFFs 104 continues with the sampling process at a different sampling time and the Popcount 105 continues receiving logic states from the plurality of DFFs 104 until the evaluation circuit 107 terminates the sampling process up on detecting half of the total number of inputs have flipped logical states.

Figure 1B:
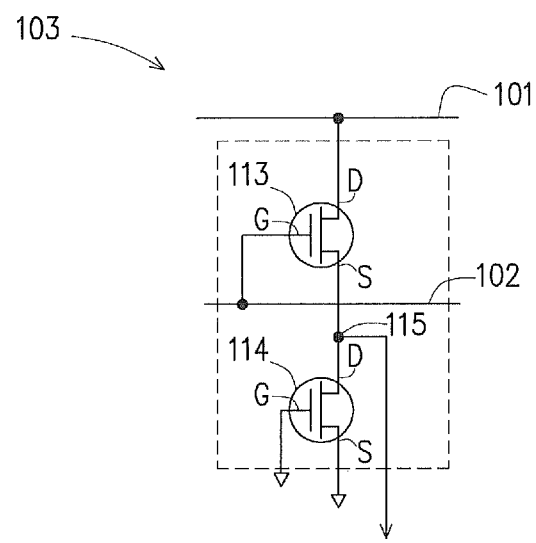
FIG. 1B illustrates a circuit diagram of a PUF cell of the PUF generator of FIG. 1A, in accordance with various embodiments of present disclosure.

FIG. 1B illustrates a circuit diagram of a PUF cell 103 in a PUF generator 100, in accordance with various embodiments of present disclosure. The PUF cell 103 comprises 2 transistors connected in series, wherein terminal S (i.e., a source) of a first transistor 113 (113-S) is connected to terminal D (i.e., a drain) of a second transistor 114 at a dynamic node 115, according to some embodiments. Terminal D of the first transistor 113 (113-D) is electrically connected to a first bus 101 and terminal G (i.e., a gate) of the first transistor 113 (113-G) is electrically connected to a second bus 102. Terminals S and G of the second transistor 114 (114-S and 114-G) are connected to GND.

In accordance with some embodiments of the present disclosure, the first and second transistors 113 and 114 may each be implemented as any of various types of transistors (e.g., a bipolar junction transistor (BJT), a high-electron mobility transistor (HEMT), etc.) while remaining within the scope of the present disclosure. In fact, the first and second transistors 113 and 114 may each be implemented as n-type metal-oxide-semiconductor (NMOS) field-effect-transistors (FET) (hereinafter "first and second NMOS transistors 113 and 114").

When a high level is applied on the second bus 102, the first NMOS transistor 113 is turned on. Terminal 113-S and thus the dynamic node 115 are then pulled up to Vcc so as to write "1" in the PUF cell 103 and remain at Vcc until the high level is removed from the second bus 102. The initial voltage value, which affects a total charge stored on the dynamic node 115 of the PUF cell 103 is determined by the threshold voltage (Vt1) of the first NMOS transistor 113 and the Vcc value, which equals to Vcc-$V_{t1}$, in accordance with various embodiments. The threshold voltage (Vt1) of the first NMOS transistor 113 is the minimum gate-to-source voltage differential that is needed to create a conducting path between the terminals source and drain. After a low level is applied on the second bus 102, the first NMOS transistor 113 is turned off. The total charge stored on the dynamic node 115 during the aforementioned charging process is then subjected to a discharge process caused by various current leakage pathways in the second NMOS transistor 114. For the same reason, a decay of the voltage versus time on the dynamic node 115 can be observed. The transient discharge behavior (i.e., voltage vs. time) on the dynamic node 115 is primarily controlled by the second NMOS transistor 114 and can be sampled by a dynamic flip-flop circuit (DFF) 104, which is further discussed in detail below.

Figure 1C:
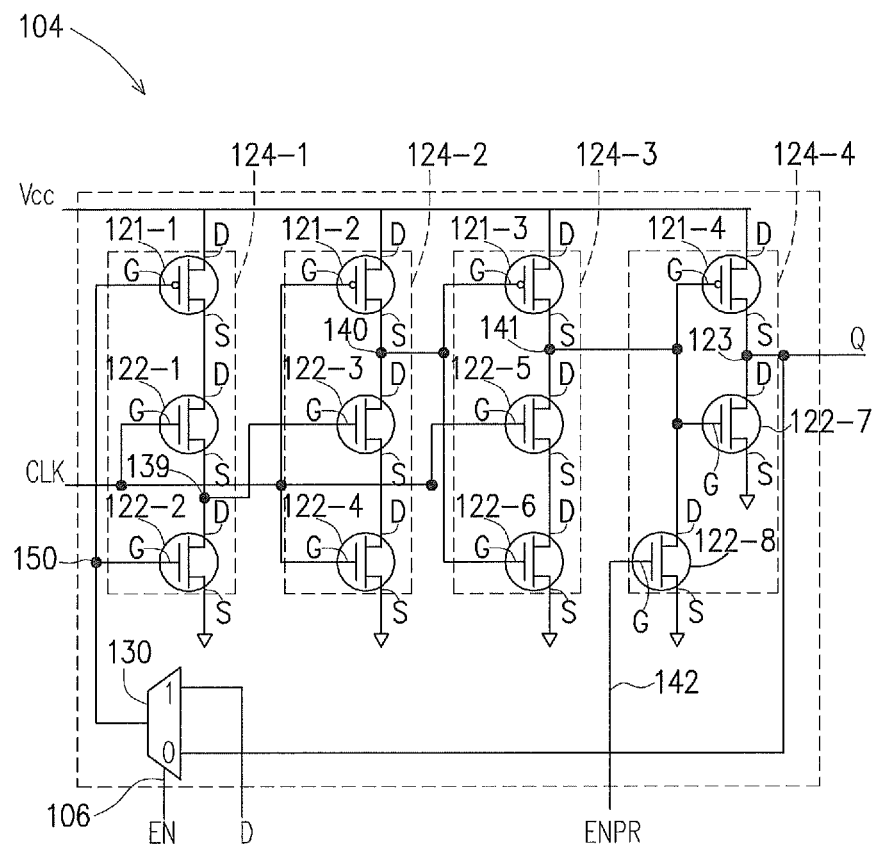
FIG. 1C illustrates a circuit diagram of a true single-phase clock (TSPC) CMOS-based D-flip-flop (DFF) circuit of a PUF generator of FIG. 1A, in accordance with various embodiments of present disclosure.

FIG. 1C illustrates a circuit diagram of a true single-phase clock (TSPC) CMOS-based D-flip-flop (DFF) circuit 104 in a PUF generator 100, in accordance with various embodiments of present disclosure. The TSPC CMOS-based DFF circuit (hereinafter "DFF") 104 comprises 4 cascades of inverters 124 and a multiplexer (MUX) 130. Each of the 4 cascades of inverters 124 comprises 1 PMOS transistor 121 and 2 NMOS transistors 122. Therefore, there are 4 PMOS transistors 121 and 8 NMOS transistors 122 in the DFF 104, wherein the clocked switching transistors are NMOS transistors 122-1, 122-4, and PMOS transistor 121-2. A reset transistor is NMOS transistor 122-8. In a first inverter 124-1, source terminal of a first PMOS transistor 121-1 (121-1-S) is coupled to drain terminal of a first NMOS transistor 122-1 (122-1-D), and source terminal of the first NMOS transistor 122-1 (122-1-S) is coupled to drain terminal of a second NMOS transistor 122-2 (122-2-D) at node 139. Drain terminal of the first PMOS transistor 121-1 (121-1-D) and source terminal of the second NMOS transistor 122-2 (122-2-S) are coupled to a first bus 101 and GND, respectively. Gate terminals of the first PMOS transistor 121-1 and the second NMOS transistor 122-2 are connected to node 150, while gate terminal of the first NMOS transistor 122-1 (122-1-G) is connected to a clock signal (CLK). A second inverter 124-2 is configured similarly, except that gate terminals of a second PMOS transistor 121-2 and a fourth NMOS transistor 122-4 are coupled to CLK, and gate terminal of a third NMOS transistor 122-3 is connected to node 139. A third inverter 124-3 is configured also similarly, except that gate terminals of a third PMOS transistor 121-3 and a sixth NMOS transistor 122-6 is coupled to node 140, and gate terminal of a fifth NMOS transistor 122-5 is connected to CLK. In a fourth inverter 124-4, source terminal of a fourth PMOS transistor 121-4 (121-4-S) is coupled to drain terminal of a seventh NMOS transistor 122-7 (122-7-D) at node 123. Drain terminal of the fourth PMOS transistor 121-4 (121-4-D) and source terminal of the seventh NMOS transistor 122-7 (122-7-S) are coupled to the first bus 101 and GND, respectively. Gate terminals of the fourth PMOS transistor 121-4 and seventh NMOS transistor 122-7 are coupled to drain terminal of an eighth NMOS transistor 122-8 (122-8-D), which is further coupled to node 141. Source and gate terminals of the eighth NMOS transistor 122-8 (122-8-S and 122-8-G) are coupled to GND and ENPR, respectively.

The state transition of the DFF 104 occurs at rising edges of the CLK. In some embodiments, this edge-triggered DFF 104 performs the flip-flop operation at small power consumption and can be implemented in integrated high-speed operations. During operation, when the CLK is at a low phase, the first inverter 124-1 samples from node 150. The second inverter 124-2 is a dynamic inverter which is in a "pre-charge" mode, with the second PMOS transistor 121-2 charging up node 140 to a high level (e.g., Vcc). The third inverter 124-3 is in the "hold" mode, since the third PMOS transistor 121-3 and the fifth NMOS transistor 122-5 are off. Therefore, during the low phase of the CLK, the third inverter 124-3 holds its previous value on node 141 and remains stable. In some embodiments, the CLK generated by a clock generator with steep transition slopes is used. For example, local buffers can be introduced to ensure the quality of the CLK. On a rising edge of the CLK and when node 139 is high on the rising edge, node 140 discharges. The third inverter 124-3 is on during a high phase of the CLK, and the value on node 140 is then passed to node 141. On the positive phase of the CLK, node 139 transits to a low level if the input on node 150 transits to a high level. Therefore, the input at node 150 should be kept stable till the rising edge of the CLK propagates to node 140. If the node 141 is at a high level, the fourth PMOS transistor 121-4 is turned off and the seventh NMOS transistor 122-7 in the fourth inverter 124-4 is turned on, causing node 123 to discharge to a low level. If node 141 is at a low level, the fourth PMOS transistor 121-4 is turned on and the seventh NMOS transistor 122-7 in the fourth inverter 124-4 is turned off, leading to a charge of node 123 to a high-level. The fourth inverter 124-4 can be reset by applying a high level to node 142 on terminal ENPR which turns on the eighth NMOS transistor 122-8. Node 141 is then pulled down to GND which then turns on the fourth PMOS transistor 121-4, followed by pulling up node 123 to a high level (e.g., Vcc).

Input terminal 0 of the MUX 130 is coupled to node 123, while input terminal 1 of the MUX 130 is coupled to the dynamic node 115 of a corresponding PUF cell 103 and output terminal of the MUX 130 is coupled to node 150. Finally, terminal EN 106 of the MUX 130 is coupled to the fifth bus 106. When a low level is applied on the terminal EN 106 of the MUX 130, the input terminal 0 and thus the value on node 123 is selected as the input to the DFF 104 on node 150. The feedback through the 4 cascade of inverters holds the output stable while the terminal EN 106 switches to a high level. When a high level is applied on the terminal EN 106 of the MUX 130, the input terminal 1 and thus the value on the dynamic node 115 of the corresponding PUF cell 103 is selected. Similarly, the feedback through the 4 cascade of inverters holds the output stable while the terminal EN 106 switches to a low level. In some embodiments, the MUX 130 can be constructed using a plurality of NAND gates, which will be described in further detail below in FIG. 1D.

As discussed above, in addition to the variations in PUF cells 103, inherent process variations during fabrication can also create variations in DFFs 104 which can affect a PUF signature, in accordance with various embodiments. Specifically, variations in physical properties of the CMOS transistors of the DFFs can contribute to variations in flip-flop performances (e.g., setup time, hold time and propagation delay). More specifically, the different transient discharge responses of transistors especially those pull-down NMOS transistors (e.g., 122-3, 122-4, 122-5 and 122-6) in the second and the third inverters can determine different trigger points. That is, for two identical transient discharge behaviors, two DFFs 104 can create two different PUF signatures due to different trigger points.

Figure 1D:
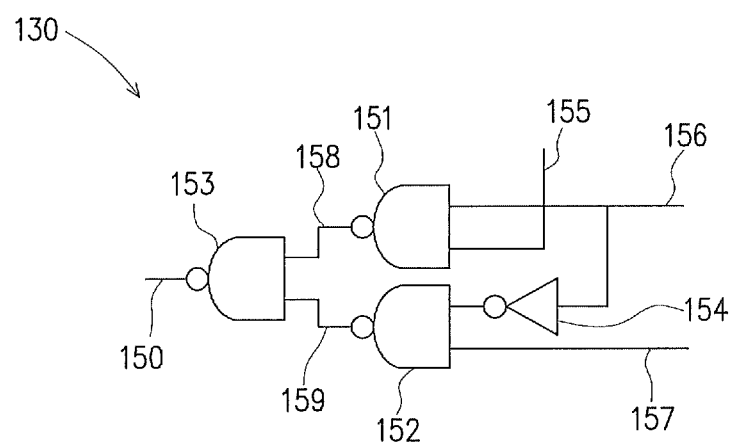
FIG. 1D illustrates a block diagram of a two-input multiplexer (MUX) circuit in a D-flip-flop (DFF) circuit of FIG. 1C and its truth table, in accordance with various embodiments of present disclosure.

FIG. 1D illustrates a block diagram of a MUX circuit 130 with two inputs in a DFF 104 of a PUF generator 100 and its truth table, in accordance with various embodiments of present disclosure. The multiplexer (MUX) 130 selects one of 2 analog or digital inputs and forwards the selected input into an output. In certain embodiments, the MUX circuit 130 comprises 3 NAND (negative-AND) gates 151, 152, and 153, and 1 inverter 154. A NAND gate is a logic gate which produces an output which is false only if all its inputs are true. Input terminals 155 and 156 of the first NAND gate are connected to the dynamic node 115 of the corresponding PUF cell 103 and the fifth bus 106, respectively. One of the input terminals of the second NAND gate is connected to the fifth bus 106 through an inverter 154, while the other input terminal 157 is connected to the node 123 between the fourth PMOS transistor 121-4 and the seventh NMOS transistor 122-7 of the DFF 104 of FIG. 1C. The output terminals 158 and 159 of the first and second NAND gates 151 and 152 are connected to input terminals of a third NAND gate 153. An output terminal 150 of the third NAND gate 153 is then connected to terminals G of the first PMOS transistor 121-1 and the second NMOS transistor 122-2 of the DFF 104 of FIG. 1C.

In some embodiments, the inverter 154 can be a NAND gate with its two input both connected to the fifth bus 106. In some embodiments, the inverter 154 is an operational amplifier (Op Amp) in an inverting configuration, in which a positive terminal of the Op Amp is connected to GND and the negative terminal is connected to its output directly through a feedback resistor with a resistance of $R_F$. With an input resistance of $R_{IN}$, the output is then defined by the Gain (ration of $R_F/R_{IN}$) and the input voltage level on the negative terminal. In some embodiments, $R_F$ equals to RN can be used and an inversion function with a unit gain can be achieved.

During operation, when a low level (i.e., logic "0") is applied on node 156, node 157 passes its input level through the MUX 130 to node 158 as an output, while input at node 155 is blocked. When a high level (i.e., logic "1") is applied on node 156, node 155 passes its input level through the MUX 130 to node 158 as an output, while input at node 157 is blocked.

Figure 1E:
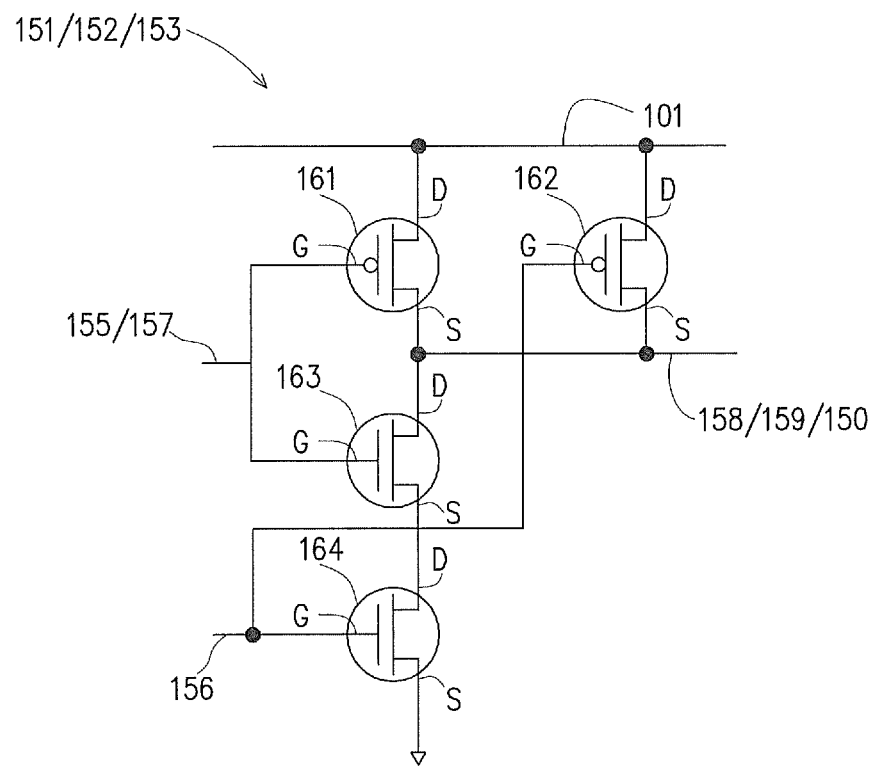
FIG. 1E illustrates a circuit diagram of a Negative-AND (NAND) gate of the multiplexer (MUX) circuit of FIG. 1D and its truth table, in accordance with various embodiments of present disclosure.

FIG. 1E illustrates a circuit diagram of a Negative-AND (NAND) gate 151, 152, and 153 in a MUX 130 of FIG. 1C and its truth table, in accordance with various embodiments of present disclosure. In some embodiments, the NAND gate 151/152/153 can be a NMOS NAND gate or a PMOS NAND gate. In certain embodiments, the NAND gate 151/152/153 can be a CMOS NAND gate.

The NAND gate 151/152/153 comprises 2 PMOS transistor 161 and 162, and two NMOS transistors 163 and 164, wherein terminal S of a first PMOS transistor 161 (161-S) is coupled to terminal D of a first NMOS transistor 163 (163-D) and terminal S of the first NMOS transistor 163 (163-5) is coupled to terminal D of a second NMOS transistor 164 (164-D). Terminal D of the first PMOS transistors 161 is coupled to the first bus 101. Terminals S of the second NMOS transistor 164 (164-S) is electrically coupled to GND. In some embodiments, terminals G of the first PMOS transistor 161 and the first NMOS transistor 163 are connected and further electrically coupled to either dynamic node 115 of the corresponding PUF cell 103 in the first NAND gate 151 or output node 123 of the corresponding DFF 104 in the second NAND gate 152. Terminal G of the second NMOS transistor 164 is coupled to the fifth bus 106 at node 156 in the first NAND gate 151 or to bus 106 through the inverter 154 in the second NAND gate 152, in some embodiments. Terminal G of a second PMOS transistor 162 is coupled to terminal G of the second NMOS transistor 164, while terminals D and S of the second PMOS transistor 162 are coupled to the first bus 101 and terminal S of the first PMOS transistor 161, respectively. Terminals S of the first and second PMOS transistors 161 and 162 are coupled to output node 158/159/150.

During operation, when a high level (i.e., logic "1") is applied on node 156, the level on the terminal 162-S is pulled down to GND by the second NMOS transistor 163. Node 155/157 passes its inverted input level to node 158/159/150 caused by the either pull-up PMOS transistor 161 or the pull-down NMOS transistor 163. When a low level (i.e., logic "0") is applied on node 156, the level on node 158/159/150 is independent of the level on node 155/157, because node 158/159/150 is always pulled up by the second PMOS transistor 162 to a high level (i.e., Vcc).

Figure 2:
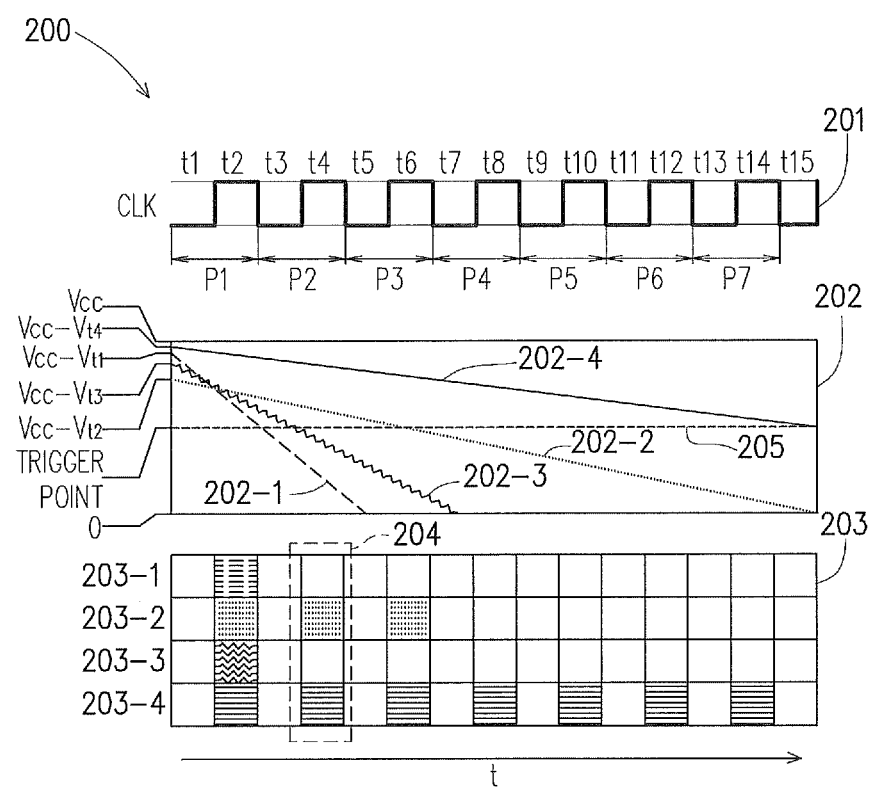
FIG. 2 illustrates exemplary signals on dynamic nodes and on output nodes of D-flip-flop (DFF) circuits used by the PUF generator of FIG. 1A to generate a PUF signature, in accordance with various embodiments of the present disclosure.

FIG. 2 illustrates exemplary signals 200 on dynamic nodes 115 of PUF cells 103 and on output nodes 123 of corresponding DFFs 104 used by the PUF generator 100 of FIG. 1A to generate a PUF signature 204, in accordance with various embodiments of present disclosure. For simplicity, a 4-cell PUF generator, which generates a 4-bit PUF signature, is used here for discussion purposes, in accordance with some embodiments. It is also noted that various features in the Figure are not necessarily drawn to scale and may be arbitrarily increased or reduced for clarity of illustration.

The clock signal 201 in a form of a square wave that oscillates between a high and a low state is typically used in synchronous digital circuits. The clock signal 201 used in this embodiment has a 50% duty cycle with a fixed constant frequency. In certain embodiments, any type of clock signals can be used with different frequency or duty cycles.

Linear transient discharge behaviors 202 on dynamic nodes 115 of PUF cells 103 are used to illustrate a generation process of a PUF signature, in accordance with various embodiments. For clarity, the numeral 202-1, 202-2, 202-3 and 202-4 are used to refer to the transient discharge behaviors on dynamic nodes 115 of the first, second, third and fourth PUF cell 103, respectively. Transient discharge behaviors 202 depend on the mechanisms that govern the leakage of charge stored on the dynamic nodes 115 in forms of leakage current. In some embodiments, the transient discharge behavior is a function of the geometry of the transistor (channel length, gate oxide thickness, etc.), dielectric constant, threshold voltage (Vt), initial voltage before discharging (Vcc-Vt), mobility of electrical carriers, temperature, etc. In some embodiments, the second NMOS transistor 114 is larger than the first NMOS transistor 113 in order to expedite the PUF signature generation process. In some embodiments, the transient discharge behavior 202 can be exponential. Different transient discharge behaviors 520 at the dynamic nodes 115 can result in different time to discharge and most importantly, different time to reach trigger points 205, where the DFFs 104 output flipped logical states. For clarity purposes, a constant trigger point 205 (i.e., Vcc/2) is used for all DFFs 104, according to some embodiments. In another embodiment, different trigger points 205 caused by variations in DFFs 104 can be used. In some embodiments, when different trigger points 205 defined by the DFF circuits are used with the same PUF cells, different PUF signatures can be generated. Therefore, a PUF signature is uniquely defined by the PUF cells 103 in combination with DFFs 104.

Initial voltages after charging at the dynamic nodes 115-1, 115-2, 115-3, and 115-4 of 4 PUF cells 103 are Vcc-Vt1, Vcc-Vt2, Vcc-Vt3 and Vcc-Vt4, respectively, wherein Vt1, Vt2, Vt3 and Vt4 are threshold voltages of the first NMOS transistors 113 of the first, second, third and fourth PUF cell 103, respectively. According to this embodiment, these initial voltage values before discharging have a relationship as the following, 0<Vcc-Vt2<Vcc-Vt3<Vcc-Vt1<Vcc-Vt4<Vcc. Different threshold values are caused by variations in fabrication processes which result in variations in physical properties of transistors, for example, oxide thickness, doping concentration, doping fluctuation, permittivity of oxide and substrate, etc. Different initial voltage levels further result in different total charges stored on the dynamic nodes 115.

Corresponding outputs 203 from nodes 123 of DFFs 104 are also illustrated in FIG. 2. Simultaneously with, or subsequently to the transient discharge behaviors 202 transitioning from initial voltages to the trigger point 205, the DFFs 104 may generate a low level (logic "0") on its output when the clock signal switches from a low (logic "0") to a high (logic "1") level. Because of a fast discharge behavior (202-1) in the first PUF cell 103-1 due to potentially high leakage current in the second NMOS transistor 114 of the first PUF cell 103-1, the transient behavior at dynamic node 115-1 triggers the first DFF 104-1 to flip its logical state and to output a "0" at a sampling time t4. Similarly, discharge behaviors 202-2, 202-3 and 202-4 that are all slower than 202-1 trigger the corresponding DFFs 104 to output "0" at sampling time t6, t4 and t15, respectively. Since the discharge behavior 202-3 across the trigger point 205 before the rising edge of sampling time t4, although the discharge of 202-3 is slower than that of 202-1, the time when the two corresponding DFFs 104 both output "0"s are actually the same (i.e., t4), in accordance with various embodiments.

At a sampling point t4, both the second and fourth PUF cells/DFF pairs deliver outputs of zero. The popcount detects a number (i.e., 2) of zeros, which is then compared to the total number (i.e., 4) of PUF cells. The sampling is then terminated at the sampling time t4 and the recorded 4-bit outputs "0101" is then used as the PUF signature 204 of this PUF generator.

Figure 3:
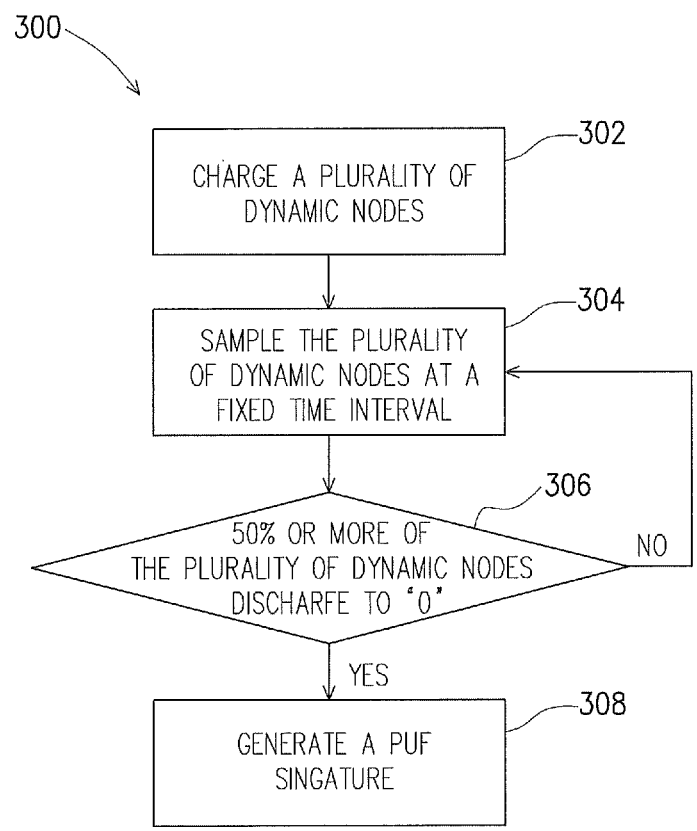
FIG. 3 illustrates an exemplary flowchart of a method of generating a PUF signature based on the PUF generator of FIG. 1A, in accordance with various embodiments of the present disclosure.

FIG. 3 illustrates a flowchart of a method 300 to generate a PUF signature using a PUF generator 100, in accordance with various embodiments of present disclosure. In various embodiments, the operations of method 300 are performed by the respective components illustrated in FIGS. 1A-1E, in accordance with various embodiments. For the purpose of a discussion, the following embodiment of the method 300 will be described in conjunction with FIGS. 1A-1E and 2. The illustrated embodiment of the method 300 is merely an example. Therefore, it should be understood that any of a variety of operations may be omitted, re-sequenced, and/or added while remaining within the scope of the present disclosure.

The method 300 starts with operation 302 in which a plurality of dynamic nodes of a plurality of PUF cells are charged to high levels (e.g., logic "1"), in accordance with various embodiments. Applying a high level on bus 102 turns on a plurality of first NMOS transistors, which then pull up the plurality of dynamic nodes to high levels so as to the plurality of dynamic nodes to be written with logic "1". The exact charges stored at the plurality of dynamic nodes are defined by corresponding threshold voltages of the plurality of first NMOS transistors.

The method 300 continues with operation 304 in which the transient discharge behaviors of the plurality of dynamic nodes are sampled at a fixed time interval. As described above, a plurality of DFF circuits corresponding to the plurality of PUF cells may be used to perform the sampling, as shown and discussed in FIGS. 1A-1E and 2. The transient discharge behaviors associated with the plurality of dynamic nodes are caused by leakage current on corresponding second NMOS transistors, including parasitic sub-threshold current, gate leakage current caused by Fowler-Nordheim tunneling, gate induced drain leakage current, reverse bias current, etc. Inherent process variations result in variations of discharge behavior at the plurality of dynamic nodes. When a clock signal switches from a low to a high level, voltage values at the plurality of dynamic nodes of PUF cells are sampled and compared to trigger points defined by the corresponding DFF circuits. A logic "1" is generated if the voltage value on the dynamic node is higher than the trigger point, and similarly, its logical state is flipped and a logic "0" is generated if the voltage value drops below the trigger point.

The method 300 continues with operation 306 in which a total number of dynamic nodes with logic "0" are received and counted by a popcount and compared to a total number of the plurality of dynamic nodes in the PUF generator circuit 100, i.e., N, in accordance with various embodiments. If the total number of dynamic nodes with logic "0" are smaller than N/2, the method 300 continues with operation 304 wherein a new sampling on a second sampling time is performed on the plurality of dynamic nodes. If the total number of dynamic nodes with logic "0" are equal to or greater than N/2, the method 300 continues with operation 308, wherein an N-bit binary symbol generated on the particular sampling time is output as a PUF signature. As discussed above in FIGS. 1A-E and 2, time needed to discharge of a dynamic node and to output a logic "0" are affected by the total charge stored on the dynamic node, total leakage current on the second NMOS transistor, and the trigger point defined by the corresponding DFF circuit.

Figure 4A:
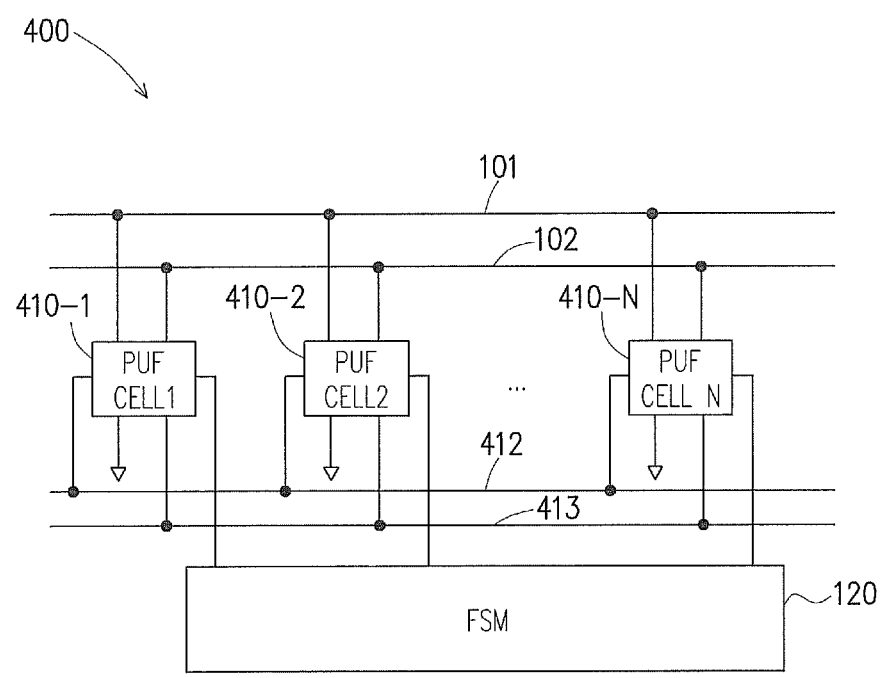
FIG. 4A illustrates an exemplary block diagram of a PUF generator, in accordance with various embodiments of the present disclosure.

FIG. 4A illustrates an exemplary block diagram of a PUF generator 400, in accordance with various embodiments of the present disclosure. It is noted that the system 400 is merely an example, and is not intended to limit the present disclosure. Accordingly, it is understood that additional operations may be provided before, during, and after the system 400 of FIG. 4A, and that some other operations may only be briefly described herein.

Compared to FIG. 1A, in addition to a first bus 101 and a second bus 102, a third bus 412 (read-enable bus) and a fourth bus 413 (pre-discharge bus) are provided to a plurality of PUF cells 410. Output from the PUF cells 410 are connected to a FSM circuit 120. More specifically, outputs are connected to corresponding DFFs 104 followed by a popcount 105 and an evaluation logic circuit 107 as described and discussed in FIG. 1A, 1C-E.

Figure 4B:
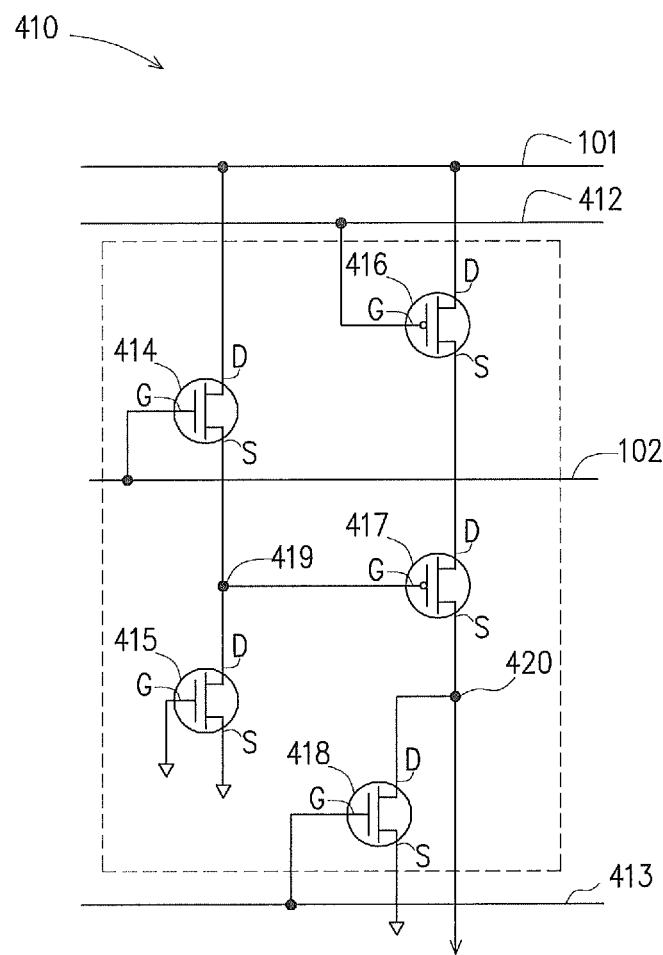
FIG. 4B illustrates a circuit diagram of a PUF cell of the PUF generator of FIG. 4A, in accordance with various embodiments of present disclosure.

FIG. 4B illustrates a circuit diagram of a PUF cell 410 of the PUF generator 400 of FIG. 4A, in accordance with various embodiments of present disclosure. The PUF cell 410 comprises 3 NMOS transistors (i.e., 414, 415, and 418) and 2 PMOS transistor (i.e., 416 and 417). Source terminal of a first NMOS transistors 414 (414-S) and drain terminal of a second NMOS transistor 415 (415-D) are coupled at a first dynamic node 419, while drain terminal of the first NMOS transistor 414 (414-D) and source terminal of the second NMOS transistor 415 (415-S) are coupled to the first bus 101 and GND, respectively. Gate terminals of the first NMOS transistor 414 and the second NMOS transistor 415 are coupled to the second bus 102 and GND, respectively. Source terminal of a first PMOS transistor 416 (416-S) is coupled directly to drain terminal of a second PMOS transistor 417 (417-D) and source terminal of the second PMOS transistor 417 (417-S) is coupled to drain terminal of a third NMOS transistor 418 (418-D) at a second dynamic node 420. Drain and gate terminals of the first PMOS transistor 416 (416-G) are coupled to the first bus 101 and the third bus 412, respectively. Gate terminal of the second PMOS transistor 417 (417-G) is coupled to the first dynamic node 419. Finally, gate and source terminals of the third NMOS transistor 418 (418-G and 418-S) are coupled to the fourth bus 413 and GND, respectively. The first bus 101 provides a voltage at a level of Vcc. The second bus 102 is to charge the first NMOS transistor 414, while the third bus 412 is to enable to read of the second dynamic node 420 by turning on the first pulling-up PMOS transistor 416. The fourth bus 413 is to pre-discharge a second dynamic node 420 of the PUF cell 410 through the third pulling-down NMOS transistor 418.

After turning on the first NMOS transistor 414 by applying a high level on bus 102, the first dynamic node 419 is charged by the first NMOS transistor 414. The voltage level at the first dynamic node 419 is pulled up to a voltage level of Vcc-Vt1, wherein Vt1 is the threshold voltage of the first NMOS transistor 414. When a low level is applied on the third bus 412, the first pulling-up PMOS transistor 416 is turned on. Initially, since the first dynamic node 419 is charged to a high level of Vcc-Vt, the second PMOS transistor 417 is thus off, the second dynamic node 420 after pre-discharged by applying a high level on the third NMOS transistor 418 remains at a low level. During discharge of the first dynamic node 419 because of leakage current on the first NMOS transistor 415, there exists a time where the voltage level on the first dynamic node 419 becomes low enough to turn on the second PMOS transistor 417 in order to charge the second dynamic node 420 to a high level, which equals to Vcc-Vt3-Vt4, wherein Vt3 and Vt4 are the threshold voltages of the first and second PMOS transistor 416 and 417.

Figure 5:
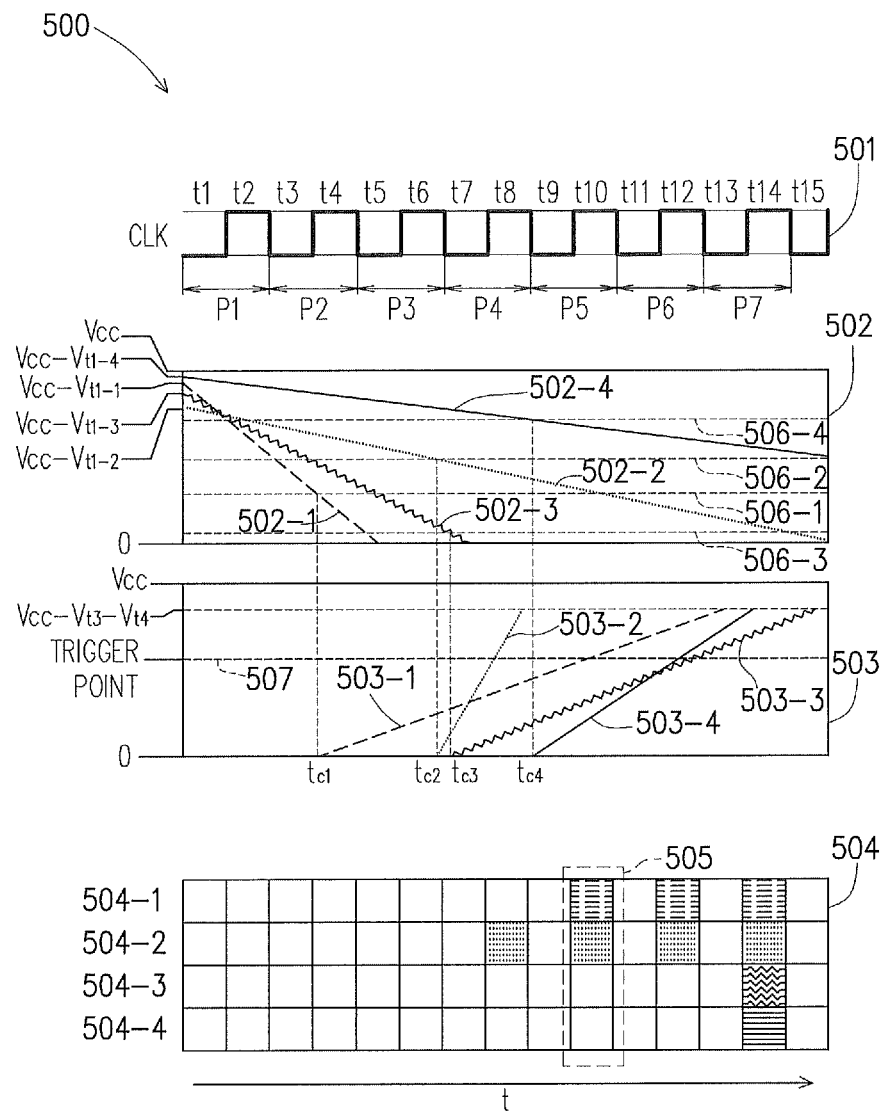
FIG. 5 illustrates exemplary signals on first and second dynamic nodes and on output nodes of D-flip-flop (DFF) circuits used by the PUF generator of FIG. 4A to generate a PUF signature, in accordance with various embodiments of the present disclosure.

FIG. 5 illustrates exemplary signals 500 on a first and second dynamic nodes (419 and 420) and on output nodes 123 of DFF 104 versus time used by the PUF generator 400 of FIG. 4A to generate a PUF signature 505, in accordance with various embodiments of the present disclosure. For simplicity, a 4-cell PUF generator, which generates a 4-bit PUF signature, is used here for discussion purposes, in accordance with some embodiments. It is noted that this is merely an example, and is not intended to limit the present disclosure. It is noted that various features in the Figure are not necessarily drawn to scale and may be arbitrarily increased or reduced for clarity of illustration.

The discharge processes of the first dynamic nodes 419 in the four PUF cells are not repeated here as it is previously described in FIG. 2. The transient discharge behaviors of the first dynamic nodes 419 trigger the charge of the second dynamic node 420 by turning on the second PMOS transistors 417. Trigger points 506 to start charging the second dynamic nodes 420 are controlled by threshold voltages (Vt4) of the second PMOS transistors 417 of the PUF cells 410. The threshold voltages of the four second PMOS transistors 417 are different due to the inherent process variation, which can be utilized to generate a unique PUF signature, according to various embodiment.

Referring to FIG. 5 again, dashed lines 506-1 ($V_{t1-1}$), 506-2 ($V_{t1-2}$), 506-3 ($V_{t1-3}$) and 506-4 ($V_{t1-4}$) represent the threshold voltages of the second NMOS transistors 415 in a first, second, third and fourth PUF cells 410, respectively. Cross points between the dashed lines 506 and corresponding transient discharge behaviors 502 are the time when the corresponding second PMOS transistors 417 are turned on. In some embodiments, Vt1-4>Vt1-2>Vt1-1>Vt1-3 can affect the total charged stored on the first dynamic nodes 419 and with the same transient discharge behaviors different threshold voltages may lead to different time at which the second PMOS transistors are turned on in order to charge the second dynamic nodes 420.

Transient charge behaviors 503 (i.e., voltages versus time) on the second dynamic nodes 420 of the 4 PUF cells 410 are also shown in FIG. 5. The 4 second dynamic nodes 420 start to get charged after the second PMOS transistors 417 in the first, second, third and fourth PUF cells 410 are turned on at tc1, tc2, tc3 and tc4, respectively. Each of the 4 second dynamic nodes 420 takes a different time to charge (i.e., different slopes), in some embodiments. The voltages on the 4 second dynamic nodes 420 once they are fully charged can be calculated using Vcc-Vt3-Vt4. Therefore, at different threshold voltages from the first and second PMOS transistors 416 and 417, the voltages at the second dynamic nodes 420 once charged can be different. For clarity purposes, a constant Vcc-Vt3-Vt4 is used for all 4 second dynamic nodes 420. As discussed above, trigger points for the DFF 104 to detect a transition of logical states can be different and are defined by the DFFs 104 especially discharge transistors. For clarity purposes, a constant trigger point is also used for 4 DFFs 104. By continuously monitoring the transient charge behaviors 503 (e.g., voltage versus time) at the second dynamic nodes 420 and comparing voltage values on the second dynamic nodes at a particular sampling time to the trigger point 507, an output logic "0" or "1" can be determined for corresponding PUF cells. In certain embodiments, the second dynamic node 420 of the second PUF cell 410 is the first to get charged to a high level followed by the second dynamic node 420 of the first, fourth and third PUF cells 410.

Binary output on the output nodes 123 of the corresponding DFFs 104 are shown in block 504 of FIG. 5. Simultaneously with, or subsequently to the charge transient behaviors 503 transitioning from initial low voltages to the trigger point 507, the DFFs 104 can generate a high level (logic "1") on its output when the clock signal 501 switches from a low (logic "0") to a high (logic "1") level. The second PMOS transistor acts also as an amplifier, according to some embodiments. The first, second, third and fourth DFF circuits 104 switch logical states from 0 to 1 at sampling time t10, t8, t14 and t14, respectively. Furthermore, at the sampling time t10, two PUF cells have switched logical states from 0 to 1 and the binary sequence of the combination of logical states of all PUF cells at the sampling time t10 of 1100 is used as the PUF signature. Inherent process variations in the fabrication of the first and second NMOS transistors, the first and second PMOS transistors, and the discharge transistors in DFFs 104 determines the discharge/charge processes and trigger points, which all contribute to the generation of unique PUF signatures.

Figure 6:
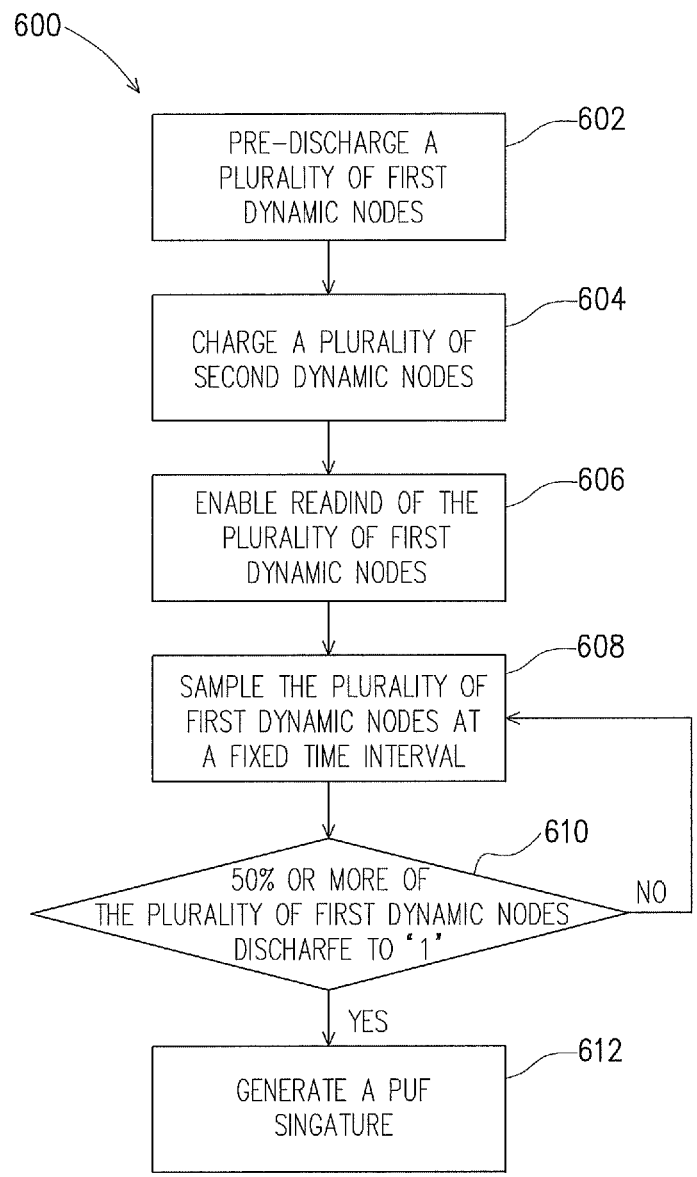
FIG. 6 illustrates an exemplary flowchart of a method of generating a PUF signature based on the PUF generator of FIG. 4A, in accordance with various embodiments of the present disclosure.

FIG. 6 illustrates a flowchart of a method 600 to generate a PUF signature using a PUF generator 400, in accordance with various embodiments. The method 600 starts with operation 602, wherein a plurality of second dynamic nodes 420 are pre-discharged to GND by applying a high level on bus 413. The method 600 continues with operation 604, wherein a plurality of first dynamic nodes 419 are charged to high levels, e.g., Vcc, by applying a high level on bus 102. The method 600 continues with operation 606, wherein a high level is applied on bus 412 to enable reading of the plurality of second dynamic nodes 420. The method 600 continues with operation 608, wherein different charging processes of the plurality of second dynamic nodes 420 caused by different discharging processes on the plurality of first dynamic nodes 419 in a plurality of PUF cells and trigger processes on output nodes 123 in a plurality of corresponding DFF circuits (FIG. 1C) are sampled at a fixed time interval. The total number of second dynamic nodes 420 that are charged from low levels i.e., "0") to high levels (i.e., "1") are compared to the total number of second dynamic nodes 420 (e.g., N). If there are less than N/2 of second dynamic nodes 420 are charged to "1", the method 600 continues with operation 608 to repeat the sampling and detection operations. If there are more than or equal to N/2 of the total number of second dynamic nodes 420 are charged to "1", the method 600 continues with operation 612, a PUF signature based on states of the plurality of PUF cells and DFF circuits is generated.

In an embodiment, a physical unclonable function (PUF) generator comprising: a plurality of PUF cells, wherein each of the plurality of PUF cells comprises a first MOS transistor and a second MOS transistor, wherein terminal S of the first MOS transistor is connected to terminal D of the second MOS transistor at a dynamic node, terminal D of the first MOS transistor is coupled to a first bus and terminal G of the first NMOS transistor is coupled to a second bus, and terminals S and G of the second NMOS transistor are coupled to ground; a plurality of dynamic flip-flop (DFF) circuits wherein each of the plurality of DFF circuits is coupled to each of the plurality of PUF cells respectively; a population count circuit coupled to the plurality of DFF circuits; and an evaluation logic circuit having an input coupled to the population count circuit and an output coupled to the plurality of DFF circuits.

In another embodiment, a method to configure a physical unclonable function (PUF) generator for generating a PUF signature, the method comprising: coupling a plurality of PUF cells to a plurality of DFF circuits, and to a population counter and further to an evaluation logical circuit, wherein each of the plurality of PUF cells comprises a first MOS transistor and a second MOS transistor; charging a plurality of dynamic nodes in the plurality of PUF cells to a plurality of first voltages through each of the plurality of first MOS transistors; discharging the plurality of dynamic nodes to a plurality of second voltages through each of the plurality of second MOS transistors; monitoring each of the plurality of second voltages using corresponding dynamic flip-flop (DFF) circuits; flipping logical states of the plurality of PUF cells from a first logical state to a second logical state when the second voltage becomes smaller than a third voltage; and generating a PUF signature when a number of PUF cells having flipped logical states are more than half of a total number of PUF cells.

Yet in another embodiment, a physical unclonable function (PUF) generator for generating a PUF signature, the PUF generator comprising: a plurality of PUF cells, wherein each of the plurality of PUF cells comprises five MOS transistors, wherein a first and a second MOS transistors are configured to charge and discharge a first dynamic node, a third and a fourth MOS transistors are configured to charge a second dynamic node, and a fifth MOS transistor is configured to discharge the second dynamic node so as to reset the second dynamic node; a plurality of dynamic flip-flop (DFF) circuits wherein each of the plurality of DFF circuits is coupled to each of the plurality of PUF cells respectively; a population count circuit coupled to the plurality of DFF circuits; and an evaluation logic circuit having an input coupled to the population count circuit and an output coupled to the plurality of DFF circuits.

Yet in another embodiment, a method to configure a physical unclonable function (PUF) generator for generating a PUF signature, the method comprising: coupling a plurality of PUF cells to a plurality of DFF circuits, and to a population counter and further to an evaluation logical circuit, wherein each of the plurality of PUF cells comprises a first, second, third, fourth and fifth transistors; charging each first dynamic nodes in the plurality of PUF cells to a plurality of first voltages through each of the plurality of first MOS transistors; discharging each first dynamic nodes to a plurality of second voltages through each of the plurality of second MOS transistors; charging each of corresponding second dynamic nodes to a third voltage when the second voltage becomes smaller than a fourth voltage; monitoring each of the plurality of third voltage using corresponding dynamic flip-flop (DFF) circuits; flipping logical states of the plurality of PUF cells from a first logical state to a second logical state when the third voltage becomes greater than a fifth voltage; and generating a PUF signature when a number of PUF cells having flipped logical states are more than half of a total number of PUF cells.

Although the disclosure has been described in terms of exemplary embodiments, it is not limited thereto. Rather, the appended claims should be construed broadly, to include other variants and embodiments of the disclosure, which may be made by those of ordinary skill in the art without departing from the scope and range of equivalents of the disclosure.

What is claimed is:

1. A physical unclonable function (PUF) generator comprising:
   a plurality of PUF cells, wherein each of the plurality of PUF cells comprises a plurality of metal oxide semiconductor (MOS) transistors;
   a plurality of dynamic flip-flop (DFF) circuits wherein each of the plurality of DFF circuits is coupled to each of the plurality of PUF cells respectively, wherein the plurality of DFF circuits each is configured to monitoring a voltage level on a node on each of the plurality of PUF cells;
   a population count circuit coupled to the plurality of DFF circuits, wherein the population count circuit is configured to determine a first number of PUF cells having flipped logical states from a first logical state to a second logical state; and
   an evaluation logic circuit having an input coupled to the population count circuit and an output coupled to the plurality of DFF circuits, wherein the evaluation logic circuit is configured to compare the first number with a predetermined number of PUF cells, wherein a PUF signature is generated when the number of PUF cells that are at the second logical state are equal to or higher than the predetermined number of PUF cells.

2. The PUF generator of claim 1, wherein the plurality of MOS transistors each comprise an n-type MOS (NMOS) transistor.

3. The PUF generator of claim 1, wherein the plurality of MOS transistors comprises:
   a first MOS transistor and a second MOS transistor, wherein a source of the first MOS transistor is connected to a drain of the second MOS transistor at a dynamic node, a drain of the first MOS transistor is coupled to a first bus and a gate of the first MOS transistor is coupled to a second bus, and a source and a gate of the second MOS transistor are coupled to ground, and
   wherein the second bus is coupled to a high voltage level at a first time so as to charge the dynamic node to a first voltage that is different from a voltage on the first bus.

4. The PUF generator of claim 3, wherein the second bus is coupled to a low voltage level at a second time so as to discharge the dynamic node to a second voltage at a third time through the second MOS transistor.

5. The PUF generator of claim 4, wherein the plurality of DFF circuits is configured to determine when the dynamic nodes of respective PUF cells flip from the first logical state to the second logical state.

6. The PUF generator of claim 4, wherein the plurality of DFF circuits configures a plurality of third voltages.

7. The PUF generator of claim 6, wherein the flip from the first logical state to the second logical state is determined when the second voltage at the third time on the dynamic node of the PUF cell becomes lower than the third voltage of the corresponding DFF circuit.

8. The PUF generator of claim 1, wherein the population count circuit is configured to detect a number of PUF cells that are at the second logical state.

9. The PUF generator of claim 1, wherein the predetermined number is equal to half a total number of PUF cells in the PUF generator.

10. The PUF generator of claim 1, wherein the PUF signature is a multi-bit binary sequence comprising a combination of logical states of each of the plurality of PUF cells in the PUF generator.

11. A method to configure a physical unclonable function (PUF) generator for generating a PUF signature, the method comprising:
coupling a plurality of PUF cells to a plurality of dynamic flip-flop (DFF) circuits, wherein each of the plurality of PUF cells comprises a first metal oxide semiconductor (MOS) transistor and a second MOS transistor;
charging a plurality of dynamic nodes in the plurality of PUF cells to a plurality of first voltages through each of the plurality of first MOS transistors;
discharging the plurality of dynamic nodes to a plurality of second voltages through each of the plurality of second MOS transistors;
monitoring each of the plurality of second voltages using corresponding DFF circuits;
flipping logical states of the plurality of PUF cells from a first logical state to a second logical state when the second voltage becomes smaller than a third voltage; and
generating a PUF signature when a number of PUF cells having flipped logical states are more than a predetermined number of PUF cells.

12. The method of claim 11, wherein the first MOS transistor is configured having a source terminal coupled to a drain terminal of the second MOS transistor at the dynamic node, a drain coupled to a first bus, and a gate terminal coupled to a second bus.

13. The method of claim 11, wherein the second MOS transistor is configured having a source and a gate terminal coupled to ground.

14. The method of claim 11, wherein the first and second MOS transistors each comprise a NMOS transistor.

15. The method of claim 11, wherein the first voltages on the dynamic nodes of corresponding PUF cells is determined by threshold voltages of the first MOS transistors of corresponding PUF cells.

16. The method of claim 11, wherein a time required for the dynamic nodes to discharge to the second voltages are determined by current leakage through the second MOS transistors of corresponding PUF cells.

17. The method of claim 11, wherein the third voltage is determined by the corresponding DFF circuits.

18. A physical unclonable function (PUF) generator comprising:
a plurality of PUF cells;
a plurality of circuits wherein each of the plurality of circuits is coupled to each of the plurality of PUF cells respectively, wherein each of the plurality of circuits is configured to monitor a voltage level on a node of each of the plurality of PUF cells;
a population count circuit coupled to the plurality of circuits, wherein the population count circuit is configured to determine a first number of PUF cells having flipped logical states from a first logical state to a second logical state; and
an evaluation logic circuit coupled to the population count circuit and the plurality of circuits, wherein the evaluation logic circuit is configured to compare the first number with a predetermined number of PUF cells, wherein a PUF signature is generated when the number of PUF cells that are at the second logical state are equal to or higher than the predetermined number of PUF cells.

19. The PUF generator of claim 18, wherein the population count circuit is configured to detect a number of PUF cells that are at the second logical state.

20. The PUF generator of claim 18, wherein the predetermined number is equal to half a total number of PUF cells in the PUF generator.

* * * * *